Oct. 26, 1965   J. KEYLWERT ETAL   3,213,836
ROTARY PISTON INTERNAL COMBUSTION ENGINE
Filed Dec. 10, 1962   3 Sheets-Sheet 1
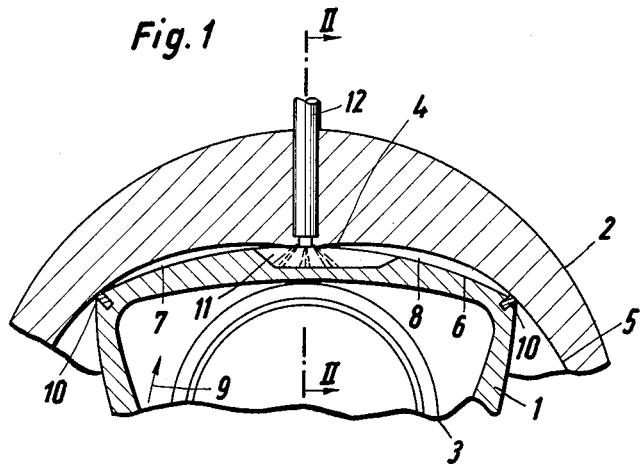
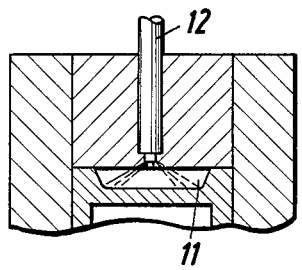
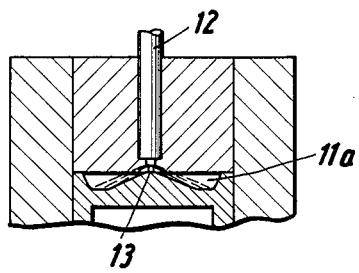
        
Fig.9     Fig.10     Fig.11
Inventors,
Johann Keylwert
Georg Jungbluth
Günther Lange
By Oct. 26, 1965    J. KEYLWERT ETAL    3,213,836
ROTARY PISTON INTERNAL COMBUSTION ENGINE
Filed Dec. 10, 1962    3 Sheets-Sheet 2

Inventors:
Johann Keylwert
Georg Jungbluth
Günther Lange
By Walter Buhr

Oct. 26, 1965    J. KEYLWERT ETAL    3,213,836
ROTARY PISTON INTERNAL COMBUSTION ENGINE
Filed Dec. 10, 1962    3 Sheets-Sheet 3

United States Patent Office 3,213,836
Patented Oct. 26, 1965

3,213,836
ROTARY PISTON INTERNAL COMBUSTION ENGINE
Johann Keylwert, Cologne-Kalk, and Georg Jungbluth, Cologne-Deutz, Germany, and Günther Lange, Cairo-Garden City, Egypt, assignors to Klockner-Humboldt-Deutz Aktiengesellschaft, Cologne-Deutz, Germany
Filed Dec. 10, 1962, Ser. No. 243,545
15 Claims. (Cl. 123—8)

The present invention relates to a rotary piston internal combustion engine, preferably but not exclusively to a circular piston internal combustion engine with inner mixture formation by injection of the fuel into the combustion chamber. More particularly, the invention concerns an engine of the above mentioned type, in which the engine body surrounding the inner rotor and together with the latter confining working chambers, in the plane of the rotor comprises a multi-arch inner confining surface with at least two axis-near zones, while the inner rotor eccentrically located in the engine body has in its enveloping curved surface at least three axis-parallel crests or zenith edges.

With reciprocable engine fuel injection internal combustion engines, it is customary to improve the inner mixture formation and the combustion by, at the end of the compression stroke, forceably creating an air movement in the combustion chamber by giving the combustion chamber a certain shape. To this end, certain portions of the piston surface forming a part of the combustion chamber confining wall are so designed that at the dead center point they will be closer to the corresponding oppositely located surface of the cylinder head than during other periods of the cycle. It has been found that the said air movement alone is not sufficient but that it must be combined with a corresponding movement and deviation of the atomized fuel initiated by a locally starting combustion. It is only the locally limited high pressure of said locally initiated combustion which makes possible the intensive intermixture and simultaneous ignition and combustion of the remaining fuel with the air. The precise law of this process is difficult to master. However, industry has succeeded in obtaining this effect by a proper adaptation, especially of the injection angle of multi-hole nozzle to the combustion chamber. This is verified by the obtained good extent to which the air of such internal combustion engines has been exploited.

The same possibility of exploiting an air movement also prevails with the rotary piston internal combustion engine. This possibility is given by the fact that during the compression stroke, the air is forceably displaced from a lagging partial combustion chamber into a partial combustion chamber running ahead. With internal combustion engines of this type, it is, however, for kinematic reasons not possible to obtain a random approach of certain parts of the rotor contour forming the combustion chamber to the housing contour as is the case with reciprocable internal combustion engines in general. For this reason, it is necessary in addition to the atomizing effect of the nozzles to pay particular attention to or to find new ways of improvements of the remaining portion of the process which is necessary for the formation of the mixture and the combustion. In this connection, it is in particular necessary, in contrast to reciprocable piston engines, to take into consideration the relative movement of the inner rotor with regard to the stationary injection nozzle in the housing and to do so for improving the formation of the mixture and combustion.

It is, therefore, an object of the present invention to provide a rotary piston internal combustion engine with improved formation of the fuel-air mixture and of the combustion.

It is another object of this invention to provide a rotary piston internal combustion engine as set forth above, which will also result in a highly economical fuel consumption.

These and other objects and advantages of the invention will appear more clearly from the following specification in connection with the accompanying drawings, in which:

FIG. 1 diagrammatically illustrates a cross section through a part of a rotary piston internal combustion engine according to the invention.

FIG. 2 represents a section taken along the line II—II of FIG. 1.

FIG. 3 is a section similar to that of FIG. 2 but with a modified cross sectional shape of the combustion chamber.

Figure 4:
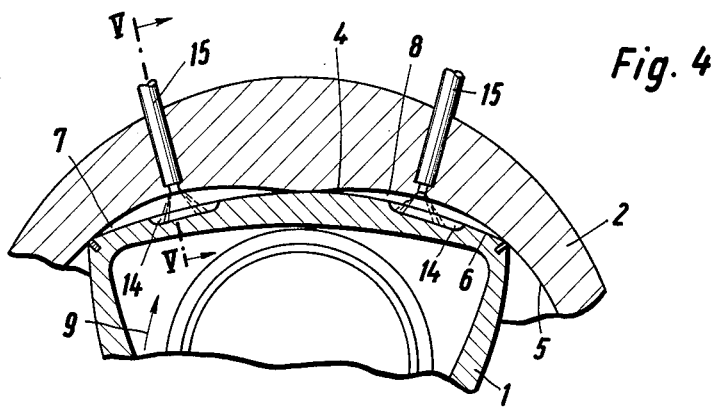

FIG. 4 diagrammatically illustrates a cross section of a portion of a rotary piston internal combustion engine somewhat modified over that of FIG. 1.

Figure 5:
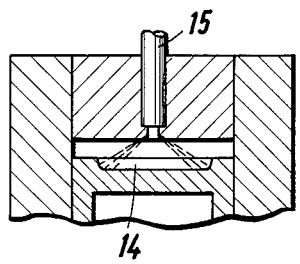

FIG. 5 is a section taken along the line V—V of FIG. 4.

Figure 6:
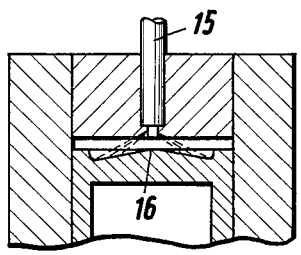

FIG. 6 represents a section similar to that of FIG. 5 but with a modified cross sectional shape of the combustion chamber.

Figure 7:
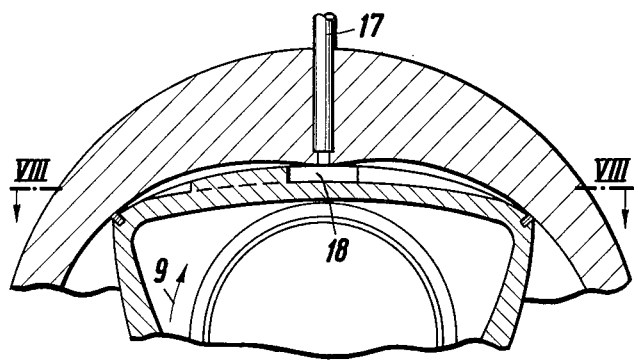

FIG. 7 illustrates a cross section through a still further modified rotary piston internal combustion engine according to the invention.

Figure 8:
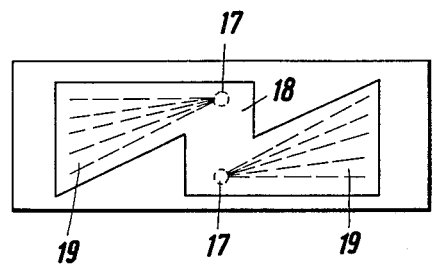

FIG. 8 shows a portion of a section taken along the line VIII—VIII of FIG. 7.

FIGS. 9, 10 and 11 respectively illustrate three different spray pictures of fuel injection nozzles as they may be employed in connection with the present invention.

The invention is characterized primarily in that a trough-like combustion chamber is provided in each portion of the enveloping surface of the inner rotor between two adjacent crests. The arrangement is such that the cross section of such trough-shaped combustion chamber is along one plane through the longitudinal central axis of the inner rotor adapted in a manner known per se as to shape to the contour of the injected fuel jets in the same plane. When looking in the direction of rotation of the inner rotor, the said trough-shaped combustion chamber has with regard to the circumference of the fuel jets in said plane a length which corresponds to the path over which a point of the enveloping curved surface of the inner rotor travels during the injection period. Such an arrangement brings about that in addition to the atomizing effect of the fuel injection nozzle, the movement of the inner rotor or of the combustion chamber with regard to the fuel injection nozzle is additionally taken advantage of for the inner formation of the mixture. The invention furthermore makes it possible also with rotary piston internal combustion engines to intermix the entire combustion air intimately with the fuel.

While the present invention will be described in connection with circular piston internal combustion engines, i.e. the specific type of rotary piston internal combustion engines in which the outer engine member surrounding the inner rotor is arranged stationarily, it is to be understood that the present invention may also be used generally in connection with rotary piston engines in which both the outer engine member and the inner engine member rotate.

With regard to the illustrated circular piston engine, it may be mentioned that the particular engine illustrated therein has the enveloping curve of its inner rotor formed in conformity with an epitrochoid. The inner confining surface of the engine body represents the epitrochoid. However, it is to be understood that the invention is not limited to the employment of the epitrochoid as basic curve for the creation of a rotary piston internal combustion engine. The invention is also applicable to other basic curves, for instance when the inner rotor formed in conformity with a hypotrochoid rotates in an engine body the inner confining surface of which has been designed in conformity with the outer enveloping curve of the hypotrochoid.

Referring now specifically to the drawings and FIG. 1 thereof in particular, the engine illustrated therein represents a rotary piston internal combustion engine with an inner rotor 1 rotatably arranged within a stationary engine body 2. The engine body 2 together with the inner rotor 1 confine working chambers including the combustion chamber of the engine.

With the circular piston internal combustion engine illustrated in FIG. 1, the engine body 2 has in the plane of the rotor 1 a multi-arched inner confining surface 5 with two axis near zones or crests 4, whereas the inner rotor 1 which is journalled on the eccentric 3 has its enveloping surface 6 provided with three axis parallel crests 10. The rotary movement of the inner rotor 1 on the eccentric 3 is effected by gear means (not shown) on the inner rotor 1 and a gear ring with inner teeth (likewise not shown) connected to the engine body 2. Said gear means are in mesh with and roll on the gear ring as described for instance in assignee's co-pending patent application Ser. No. 241,115, filed Nov. 29, 1962, substantially of even date herewith (inventor Herbert H. Haas). The rotary piston internal combustion engine operates as a four-cycle engine. The openings for the change of load are provided in a manner known per se in the engine body 2 or in the side walls. Near the end of the pre-combustion, when the axis near zones 4 of the inner confining surface 5 of the engine body 2 extend to the enveloping surface 6 of the inner rotor 1 within the range of the combustion chamber, two partial combustion chambers 7 and 8 are formed. The partial combustion chamber 7 is that one which when looking in the direction of rotation 9 of rotor 1 is located in the rear. Each of the portions of the enveloping surface 6 which is located between two adjacent crests 10 is provided with a trough-shaped combustion chamber 11. The said chamber 11 has, seen in the direction of the longitudinal axis of the inner rotor, a cross section which is shaped in conformity with the shape of the fuel jet injected along a plane passing through the longitudinal central axis of the inner rotor. This is clearly shown in FIG. 2. The fuel injection is effected by a fuel injection nozzle 12. The fuel injection nozzle has a spray picture as illustrated for instance in FIG. 9. Accordingly, the fuel injection nozzle is a multihole injection nozzle which injects the major portion of the fuel injected per stroke in a direction transverse to the direction of rotation of the inner rotor. The said nozzle injects in this way in two directions with three openings each. In a plane extending along the longitudinal central axis of the inner rotor 1, the combustion chamber trough 11 has a cross section which will assure a complete penetration of the combustion air by the fuel. According to FIG. 3 the cross section of the injection chamber trough is somewhat more shaped in conformity with the fuel jets inasmuch as said trough within the range of the fuel injection nozzle 12 has an elevation 13.

Simultaneously with the specific cross sectional shapes of the fuel injection chamber trough, the latter is characterized in that when looking in the direction of rotation 9 of the inner rotor 1, said trough has a length which corresponds to the distance by which a point of the enveloping surface 6 of the inner rotor moves during the injection period. FIG. 1 illustrates the arrangement of said fuel injection nozzle 12 within the range of the axis near zone 4 located adjacent the combustion chamber and pertaining to the inner confining surface 5 of the engine body 2. The fuel injection nozzle 12 is in FIG. 1 located in a symmetric plane with regard to the partial combustion chambers 7 and 8. It is thus located in the plane of symmetry which extends through the longitudinal central axis of the inner rotor and the combustion chamber in the dead center position of the inner rotor. When the fuel injection nozzle 12 occupies this position, it is necessary in view of the spray angle and the pre-injection to offset the trough 11 with regard to said plane of symmetry as has been clearly shown in FIG. 1. If, however, the trough 11 is located symmetrically with regard to said plane of symmetry, it will be necessary to offset the fuel injection nozzle 12 correspondingly with regard to said plane of symmetry.

The circular piston internal combustion engine illustrated in FIG. 4 has two trough-shaped combustion chambers 14 which in conformity with the showing of FIG. 4 are located in the partial combustion chambers 7 and 8 in the range of the major radial extension thereof, said partial combustion chambers 7 and 8 being separated from each other by the axis near zone 4 of the inner confining surface 5 of the engine body 2. In this instance one fuel injection nozzle 15 each is provided for each trough-shaped combustion chamber 14. The said combustion chambers 14 and the injection nozzles 15 have to be mutually offset as is the case between the fuel injection nozzle 12 and the trough-shaped combustion chamber 11 of the circular piston internal combustion engine of FIG. 1.

FIGS. 5 and 6 respectively illustrate the cross sectional shapes of the trough-shaped combustion chambers 14. In contrast to the arrangement of FIG. 5, the trough-shaped combustion chamber of FIG. 6 is within the range of the fuel injection nozzle 15 provided with an elevation 16.

Referring now to FIG. 7, this figure illustrates a circular piston internal combustion engine in which two fuel injection nozzles 17 are located adjacent each other in a plane passing through the longitudinal central axis of the inner rotor and the combustion chamber in the dead center position of the inner rotor. Of these fuel injection nozzles, one nozzle injects the fuel in the direction of rotation of the inner rotor, whereas the other nozzle injects the fuel in a direction counter to the direction or rotation of the inner rotor. The trough-shaped depression 18 in this instance has a shape which conforms to the contour of the fuel jets as is clearly shown in FIG. 8.

With rotary piston internal combustion engines having a plurality, for instance two, fuel injection nozzles, it is possible to have one of the fuel injection nozzles carry out its injection earlier than the other injection nozzle. In such an instance it may sometimes be expedient that the quantity of fuel being injected by the nozzles differ from each other. In this connection it may be emphasized that the invention is not limited to a fuel injection nozzle of the type shown in FIG. 9. The fuel injection nozzle may also have spray pictures, for instance in conformity with FIGS. 10 and 11. FIG. 10 shows a multi-hole fuel injection nozzle with round symmetrical spray openings. FIG. 11 shows a multi-hole injection nozzle which injects the major portion of the fuel to be injected per stroke in the direction of rotation of the inner rotor or in a direction counter thereto.

It is, of course, to be understood that the present invention is, by no means, limited to the particular constructions shown in the drawings but also comprises any modifications within the scope of the appended claims.

What we claim is:

1. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said outer peripheral surface of said second engine member having each outer peripheral surface section between each two adjacent crest means provided with recess means, and fuel injection nozzle means supported by said first engine member and arranged for injecting fuel into said recess means, said recess means having a length which is approximately the total of (a) the distance of travel a point on the periphery of said second engine member travels in a plane which is perpendicular to the axis of rotation of said second engine member and passes through the axis of said nozzle means during the injection period of said nozzle means and (b) the extension of the nozzle spray of said nozzle means in said plane over the bottom of said recess means, the width of said recess means being selected in conformity with the width of the spray of said nozzle means over said bottom in a direction perpendicular to said plane.

2. An internal combustion engine according to claim 1, in which said recess means is offset with regard to said nozzle means in such a way that when the plane passing through the longitudinal axis of said nozzle means and the axis of rotation of said second engine member forms the plane of symmetry with regard to two adjacent crest means of said second engine member the transverse plane of symmetry of said recess means is offset to the plane passing through the longitudinal axis of said nozzle means and through the axis of rotation of said second engine member.

3. An internal combustion engine according to claim 1, in which said nozzle means is offset with regard to said recess means in such a way that when the transverse plane of symmetry of said recess means passes through the axis of rotation of said second engine member and forms the plane of symmetry with regard to two adjacent crest means, the longitudinal axis of said nozzle means is offset with regard to said transverse plane of symmetry of said recess means.

4. A rotary piston internal combustion engine according to claim 1, in which said fuel injection nozzle means is designed as a multi-opening fuel injection nozzle, so that the major portion of the fuel injected per each working cycle of said engine is injected in a direction transverse to the direction of rotation of said second engine member.

5. A rotary piston internal combustion engine according to claim 1, in which said fuel injection nozzle means is designed as a multi-opening fuel injection nozzle so that the major portion of the injected fuel per each working cycle of said engine is injected in the direction of rotation of said second engine member.

6. A rotary piston internal combustion engine according to claim 1, in which said fuel injection nozzle means is designed as a multi-opening fuel injection nozzle so that the major portion of the fuel injected per each working cycle of said engine is injected in a direction counter to the direction of rotation of said second engine member.

7. A rotary piston internal combustion engine according to claim 1, in which said fuel injection nozzle means is a multi-opening injection nozzle with the injection openings uniformly and symmetrically distributed around the injection nozzle.

8. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said outer peripheral surface of said second engine member having each outer peripheral surface section between each two crest means provided with two recesses spaced from each other in the direction of travel of said second engine member, and two fuel injection nozzles supported by said first engine member and spaced from each other in the direction of rotation of said second engine member for respectively injecting fuel into said recesses, each of said recesses having a length which is approximately the total of (a) the distance of travel a point on the periphery of said second engine member travels in a plane which is perpendicular to the axis of rotation of said second engine member and passes through the axes of said nozzles during the injection period of at least one of said nozzles and (b) the extension of the nozzle spray of said nozzles in said plane over the bottom of said recesses, the width of each of said recesses being selected in conformity with the width of the spray of said nozzles over said bottom in a direction perpendicular to said plane, said recesses being offset to their respective nozzles in a plane passing through the axes of said nozzles and being perpendicular to the axis of rotation of said second engine member in such a way that when the plane of symmetry with regard to said nozzles passes through the axis of rotation of said second engine member and at the same time represents the plane of symmetry with regard to two adjacent crests of said second engine member, the longitudinal axes of said nozzles are offset with regard to the transverse plane of symmetry of the respective recess.

9. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said outer peripheral surface of said second engine member having each outer peripheral surface section between each two adjacent crest means provided with two recesses having their longitudinal extension in the direction of rotation of said second engine member and being spaced from each other in the direction of rotation of said second engine member, and two fuel injection nozzles supported by said first engine member and spaced from each other in the direction of rotation of said first engine member for respectively injecting fuel into said recesses, said nozzles being offset with regard to said recesses in such a way that when the plane of symmetry with regard to said crest means passes through the axis of rotation of said second engine member and simultaneously represents the plane of symmetry with regard to the longitudinal axes of said nozzles, the longitudinal axis of each nozzle is offset with regard to the transverse plane of symmetry of the respective recess pertaining thereto.

10. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said first and second engine members confining with adjacent surfaces thereof working chambers respectively varying their volume during a relative rotation of said engine members with regard to each other, said working chambers including a combustion chamber adapted during a rotation of said second engine member relative to said first engine member to be subdivided by one of said crest portions so as to form two combustion chamber sections, said outer peripheral surface of said second engine member having each outer peripheral surface section between two adjacent crest means provided with two recesses spaced from each other in the direction of rotation of said second engine member and adapted during a rotation of said second engine member directly to communicate with said combustion chamber sections, the longitudinal extension of said recesses in said last mentioned position with regard to said combustion chamber sections being the same as the longitudinal direction of said combustion chamber sections, and fuel injection means in said first engine member communicating with the respective combustion chamber sections and registering with respective ones of said recesses during rotation of said second engine member and at the time of injection of fuel into said engine.

11. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said outer peripheral surface of said second engine member having each outer peripheral surface section between each two crest means provided with a recess of a flat Z-shape comprising a central portion parallel to the axis of rotation of said second engine member and also comprising lateral arms respectively extending from opposite ends of said central portion into opposite directions, and two nozzle means supported by said first engine member and arranged so that when said central portion of said recess is below said two nozzle means, the latter are able to spray fuel into said lateral arms respectively.

12. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said outer peripheral surface of said second engine member having each outer peripheral surface section between each two adjacent crest means provided with a Z shaped recess means with axially offset circumferential leg portions and an axial portion connecting the adjacent ends of said leg portions, and laterally offset fuel injection nozzle means supported by said first engine member and arranged for injecting fuel into said leg portions of said recess means.

13. A rotary piston internal combustion engine, which comprises: a first engine member having an inner contour with a plurality of arched surfaces with at least two inwardly extending crest portions, a second engine member arranged within said first engine member and rotatable relative thereto, said second engine member having an arched outer peripheral surface with at least three outwardly extending crest means for engagement with said inner contour, said outer peripheral surface of said second engine member having each outer peripheral surface section between each two adjacent crest means provided with recess means, and fuel injection nozzle means supported by said first engine member and arranged for injecting fuel into said recess means, said recess means in each peripheral surface section for the two adjacent crest means forming two recesses spaced from each other in the direction of rotation of said second engine member, the distance between the transverse plane of symmetry of one of said two recesses from the respective adjacent crest means being greater than the distance between the transverse plane of symmetry of the other recess from the respective adjacent crest means.

14. A rotary piston internal combustion engine having an outer engine member and an inner engine member confining with each other working chambers including a combustion chamber comprising a pre-combustion section and a main combustion section and recess means in the center peripheral portion of said inner member which are disposed in said pre-combustion and said main combustion sections, respectively, at the time of fuel injection into said engine, and a fuel injector in said outer member for each combustion chamber section and operable for injecting respectively different quantities of fuel into said recesses in said pre-combustion section and said main combustion section at said time of fuel injection into said engine.

15. A rotary piston internal combustion engine having an outer engine member and an inner engine member confining with each other working chambers including a combustion chamber comprising a pre-combustion section and a main combustion section and recess means in the center peripheral portion of said inner member which are disposed in said pre-combustion and said main combustion sections, respectively, at the time of fuel injection into said engine, and a fuel injector in said outer member for each combustion chamber section and operable for injecting fuel into said recesses in said pre-combustion section and said main combustion section at respectively different times.

References Cited by the Examiner

UNITED STATES PATENTS 2,988,065  6/61  Wankel et al. _____ 123—8
3,012,550  12/61  Paschke _____ 123—8

OTHER REFERENCES

Wankel et al.: Bauart und gegenwartiger Entwicklungsstand einer Trochoiden-Rotationskolbenmaschine Mtz 21(2), pp. 33–45, February 1960.

SAMUEL LEVINE, *Primary Examiner.*

JOSEPH H. BRANSON, Jr., *Examiner.*